(12) United States Patent
Bogren et al.

(10) Patent No.: US 6,474,688 B1
(45) Date of Patent: Nov. 5, 2002

(54) STEERING ARRANGEMENT INCORPORATED WITH A DISPLAY/CONTROL PANEL

(75) Inventors: Helen Bogren; Norman Starke, both of Offenbach am Main (DE)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/685,570

(22) Filed: Oct. 11, 2000

(30) Foreign Application Priority Data

Oct. 12, 1999 (JP) ............................ 11-289236

(51) Int. Cl.[7] .............................. B62D 1/00; B62D 1/04; H01H 9/00
(52) U.S. Cl. .................... 280/771; 74/552; 200/61.54
(58) Field of Search .................. 280/775, 779, 280/771; 74/552, 492, 493; 200/61.54

(56) References Cited

U.S. PATENT DOCUMENTS

| | | | | |
|---|---|---|---|---|
| 3,744,817 A | * | 7/1973 | Ousset ................. 280/730.1 |
| 4,180,713 A | * | 12/1979 | Gonzales ................. 180/333 |
| 4,421,960 A | * | 12/1983 | Arima et al. | |
| 4,574,653 A | | 3/1986 | Hiramitsu et al. ............ 74/484 |
| 4,578,592 A | * | 3/1986 | Nakazawa et al. | |
| 4,753,599 A | * | 6/1988 | Kokubu et al. .......... 200/61.54 |
| 4,932,285 A | * | 6/1990 | Tsukamoto ................. 474/101 |
| 5,152,358 A | * | 10/1992 | Kozuka ....................... 180/78 |

FOREIGN PATENT DOCUMENTS

| | | | | |
|---|---|---|---|---|
| DE | 3402-164 A1 | 8/1984 | | |
| DE | 3420-358 A1 | 1/1985 | | |
| JP | 58183332 A | * | 10/1983 | ........... B60R/16/02 |
| JP | 6-22101 | 3/1994 | | |

\* cited by examiner

Primary Examiner—Paul N. Dickson
Assistant Examiner—Joselynn Y. Sliteris
(74) Attorney, Agent, or Firm—Arent Fox Kintner Plotkin & Kahn

(57) ABSTRACT

In a steering arrangement, an arm is connected to a pivot shaft pivotally supported by a fixed steering column for a manual steering input at its inner end, and is connected to a steering wheel at its outer end while a display/control panel is fixedly attached to the steering column by a bracket extending axially from the steering column so as not to interfere with the arm. Thus, the display panel is placed centrally with respect to the steering wheel, but remains stationary even when the steering wheel is turned. The vehicle operator can operate the control panel and/or the switch on the steering wheel without looking away from the display panel because all of them are placed close to each other and at a substantially same distance from the vehicle operator.

8 Claims, 5 Drawing Sheets

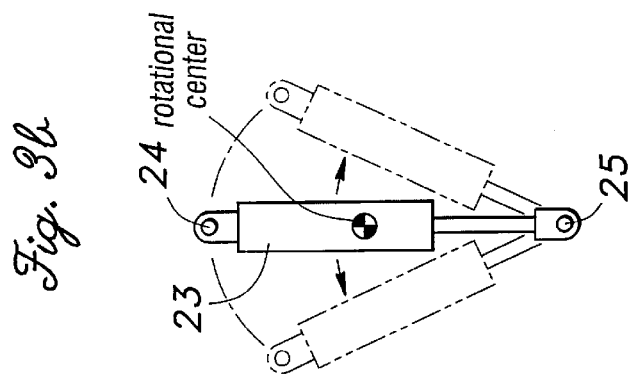
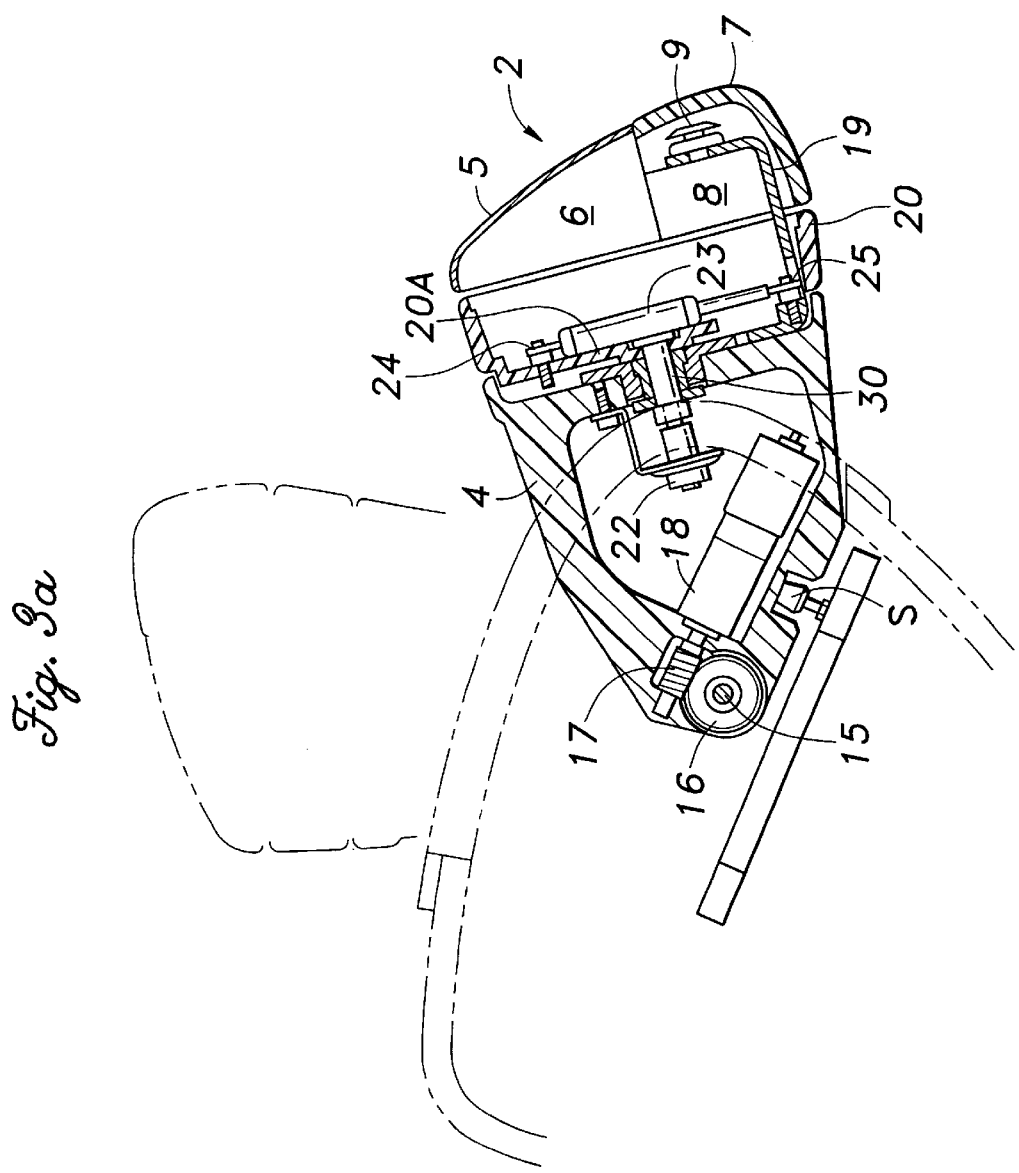

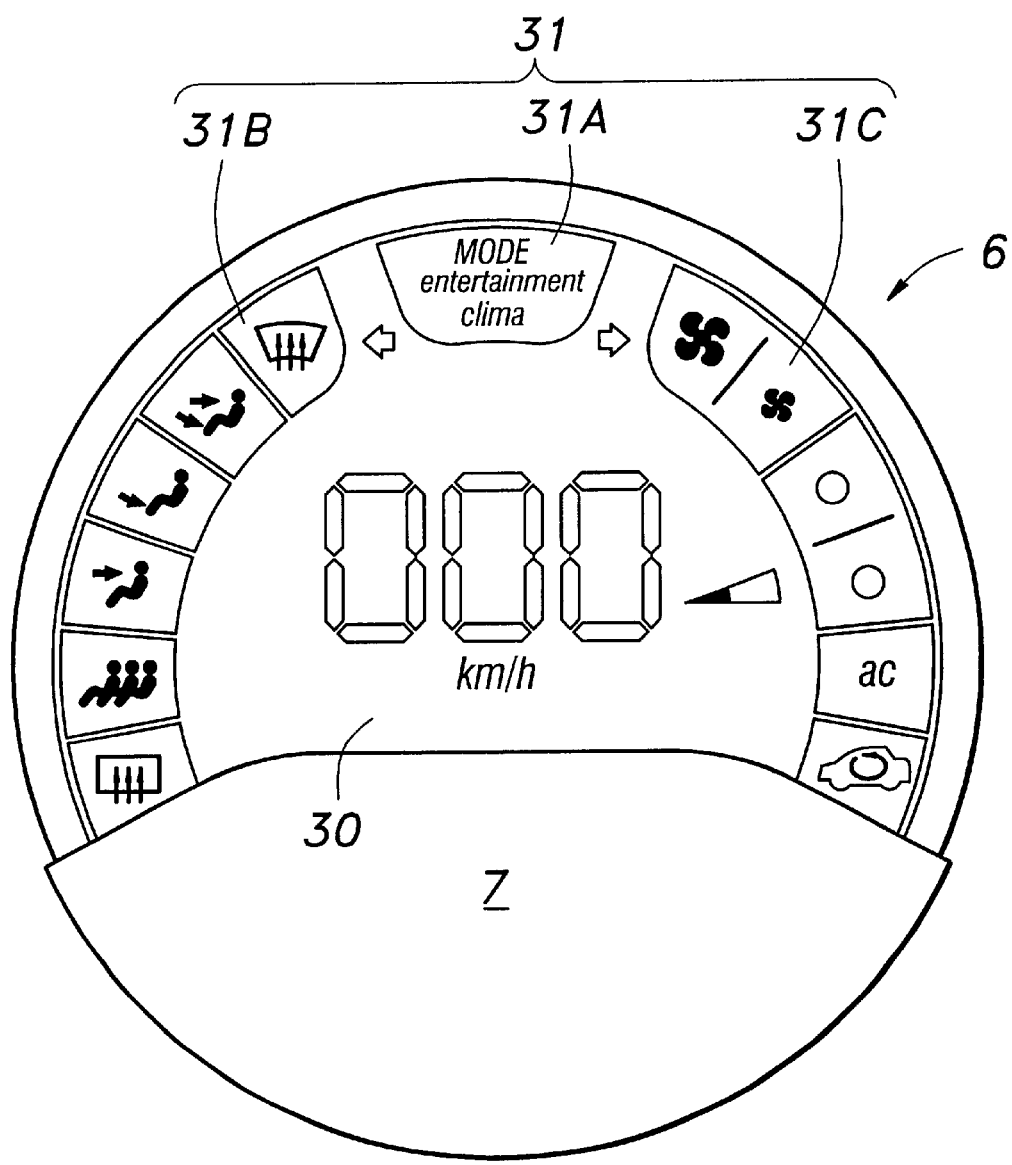

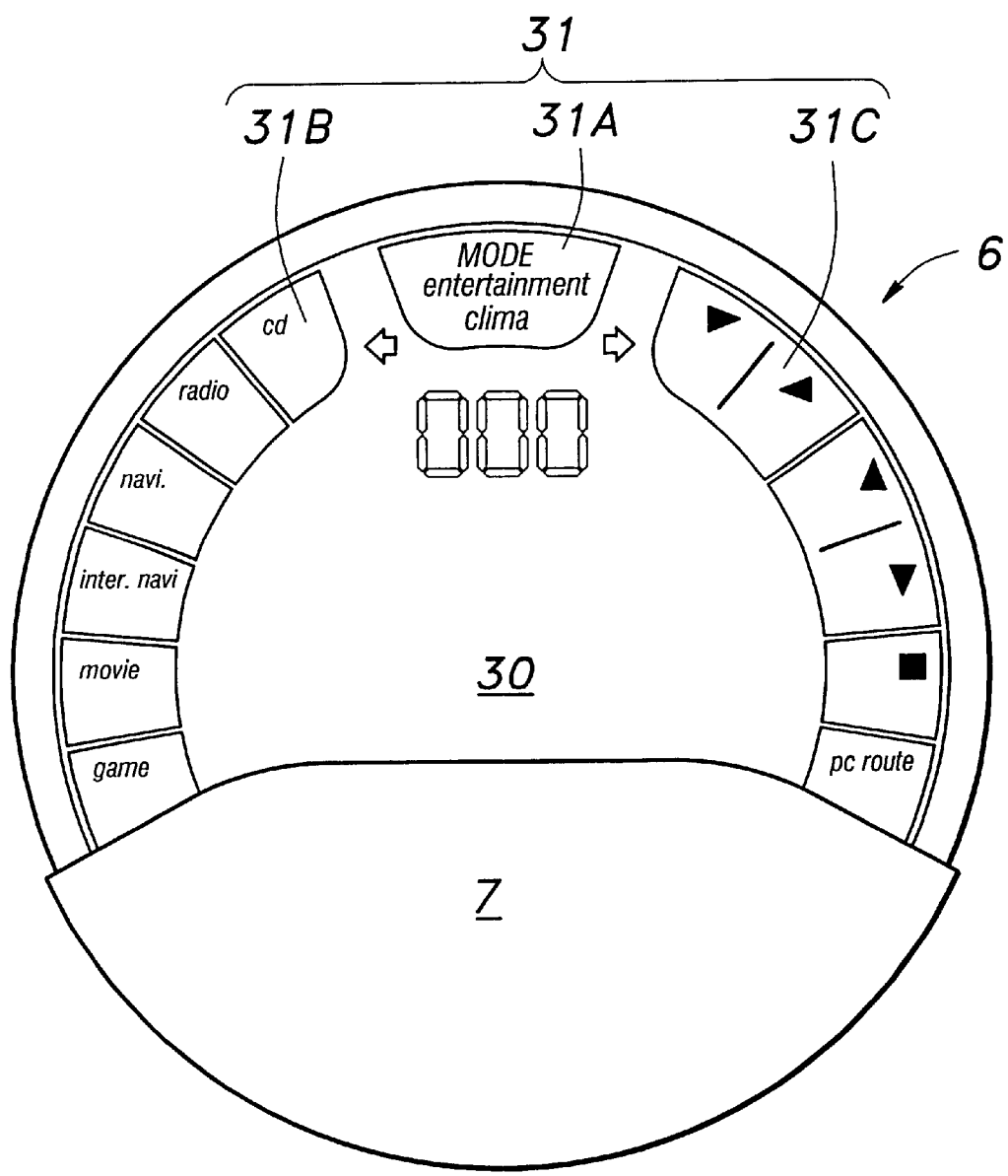

STEERING ARRANGEMENT INCORPORATED WITH A DISPLAY/CONTROL PANEL

TECHNICAL FIELD

The present invention relates to a steering arrangement for motor vehicles, and more particularly to a steering arrangement for motor vehicles incorporated with a display/control panel which remains stationary even when the steering wheel is turned.

BACKGROUND OF THE INVENTION

Conventionally, the control panels for various onboard systems such as an air conditioning system and audio system are typically placed on a dashboard, separately from the display panel for displaying various items of vehicle information such as vehicle speed and engine temperature. Typically, the display panel is placed on the other side of the steering wheel, and the control panels are placed laterally spaced from the display panel. Therefore, the vehicle operator experiences some difficulty in operating the control panel without looking away from the display panel.

To eliminate this problem, it was proposed in Japanese utility model laid open publication No. 6-22101 to incorporate a display device in the center pad of a steering wheel. However, according to this proposal, because the center pad turns as the steering wheel is turned, a certain measure is necessary to prevent a large number of cables which extend from the display device from being twisted excessively. Also, because the steering wheel is turned constantly at least by a slight angle even when the vehicle is traveling straight, the corresponding constant angular motion of the display device would be make it highly annoying for the vehicle operator to watch the display.

BRIEF SUMMARY OF THE INVENTION

In view of such problems of the prior art, a primary object of the present invention is to provide a steering arrangement incorporated with a central display panel which remains stationary even when the steering wheel is turned.

A second object of the present invention is to provide a steering arrangement incorporated with a central display/control panel which is free from the problem of excessively twisting the wiring for the central display/control panel.

According to the present invention, such objects can be accomplished by providing a steering arrangement incorporated with a display panel, comprising: a steering column fixedly attached to a vehicle body; an arm including an inner end pivotally supported by the steering column and an outer end connected to a steering wheel; and a display panel fixedly attached to the steering column by a bracket so as not to interfere with the arm, the display panel including a display surface located radially inside a part of the steering wheel adapted to be held by a hand.

Thus, the display panel is placed centrally with respect to the steering wheel, but remains stationary even when the steering wheel is turned. The control panel may also be incorporated with a control panel. The steering wheel may be also provided with at least one switch. In either case, the vehicle operator can operate the control panel and/or the switch on the steering wheel without looking away from the display panel because all of them are placed close to each other and at a substantially same distance from the vehicle operator.

Preferably, the steering wheel is connected to the outer end of the arm via a ring member which is substantially concentric with a rotational center of the arm. The ring member fills the gap which is otherwise created between the steering column and the display panel, and the external appearance of the arrangement can be aesthetically improved. To further aesthetically enhance the external appearance of the arrangement, the display panel may be provided with a substantially conformal peripheral profile.

To avoid the interference between the arm and the display panel or the bracket thereof, the bracket connecting the display panel to the steering column may extend from the steering column axially through the ring member at a position diametrically opposite the arm. By so doing, the steering wheel may be turned close to 180 degrees in each direction.

Particularly in a steer-by-wire system, it is necessary to provide a biasing arrangement for urging the steering wheel toward its neutral position. It can be accomplished in a number of ways. According to a preferred embodiment of the present invention, to accomplish this goal, the steering arrangement further comprises a linear damper connected between a part of the arm and a part of the steering column which is located diagonally opposite to the arm part with respect to the rotational center of the arm at a neutral position of the steering wheel.

BRIEF DESCRIPTION OF THE DRAWINGS

Now the present invention is described in the following with reference to the appended drawings, in which:

FIG. 3a is a sectional view of the steering arrangement of FIG. 1;

FIG. 3b is a schematic view of the linear damper incorporated in the steering arrangement of FIG. 1;

FIG. 4 is a front view of the display panel in the air conditioning mode; and

FIG. 5 is a view similar to FIG. 4 in the entertainment mode.

DETAILED DESCRIPTION OF THE PREFERRED EMBODIMENTS

Figure 1:
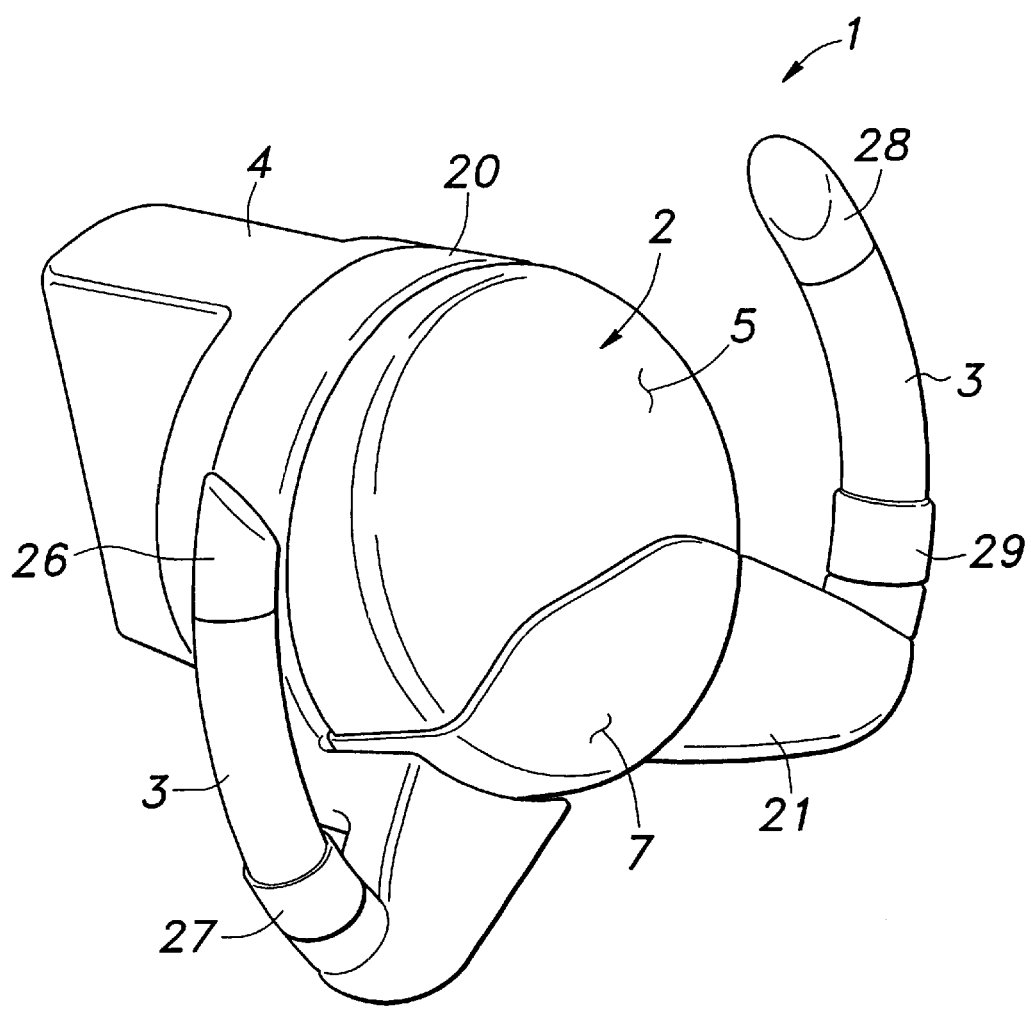
FIG. 1 is a perspective view of a steering arrangement embodying the present invention.
Figure 2:
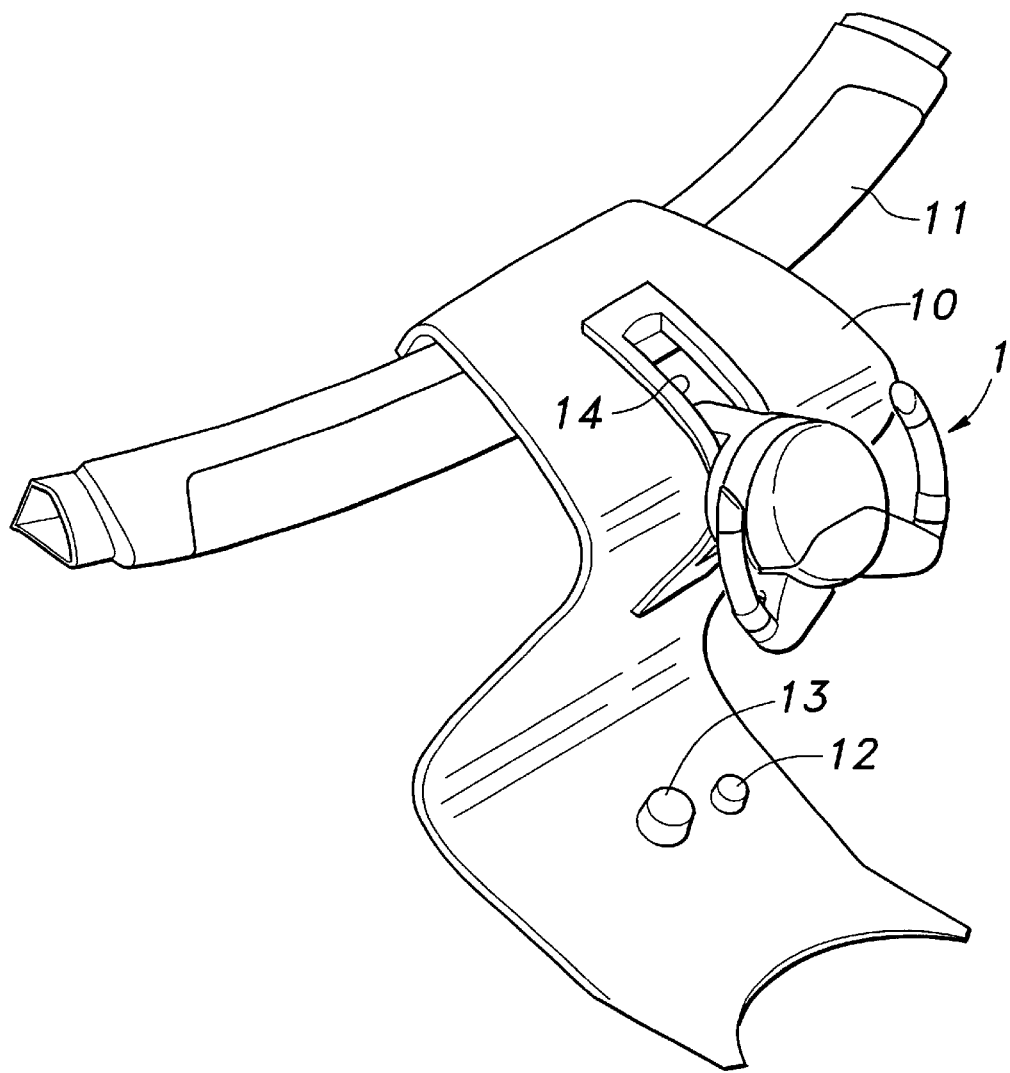
FIG. 2 is a perspective view of front dashboard fitted with the steering arrangement of FIG. 1.

FIG. 1 shows a steering arrangement 1 embodying the present invention which includes a central display/control panel 2 having a substantially circular peripheral profile, a steering wheel 3 which can turn around the central display/control panel 2, and a steering column 4 which connects the central display/control panel 2 and steering wheel 3 to the vehicle body. The steering wheel 3 in this case consists of a pair of horn shaped members, but may also consist of a normal circular steering wheel. In this embodiment, the steering wheel 3 is allowed to turn only about 160 degrees in each direction as opposed to the more conventional ring-shaped steering wheel which can turn more than 360 degrees.

As also shown in FIG. 3a, the display/control panel 2 comprises a display unit 6 covered by an upper cover 5 made of a smoked acrylic plate, and an air bag unit 8 covered by a lower cover 7 made of a relatively soft plastic material. A horn switch 9 is received inside the lower cover 7 so that a horn may be sounded by pressing the horn switch 9 from outside the lower cover 7.

The steering column 4 is attached to a front dashboard panel 10 having an S-shaped side view, and formed by molding laminated plywood. The upper end of the front dashboard panel 10 is connected to a tie bar 11 extending laterally across the vehicle body for securing various components such as those of the air conditioning system. The lower part of the front dashboard panel 10 is provided with an accelerator pedal 12 and a brake pedal 13 each given with a shape like a somewhat enlarged pushbutton.

The forward end of the steering column 4 is passed into a vertically elongated slot 14 formed in the front dashboard panel 10, and is pivotally attached to a fixed shaft 15 extending laterally with respect to the vehicle body so as to be rotatable in the vertical direction (see FIG. 3a). Thus, the steering column 4 can tilt vertically along the slot 14.

A worm wheel 16 is fixedly attached to the fixed shaft 15 which pivotally supports the steering column 4 with respect to the front dashboard panel 10, and a worm gear 17 fixedly attached to the output shaft of an electric motor 18 incorporated with a speed reduction gear unit meshes with the work wheel 16. The electric motor 18 is in turn mounted to the steering column. Thus, by activating the electric motor 18, the steering column 4, along with the steering wheel 3 can be tilted at will so as to suite the particular vehicle operator. Additionally, the steering wheel 3 can be tilted fully upward so that the vehicle operator can easily get on and off the vehicle without his knees being obstructed by the steering wheel. The most raised position of the steering wheel is indicated by the imaginary line in FIG. 3a, and the lower limit of the tilting motion of the steering wheel is defined by a stopper S provided in a fixed part of the vehicle body.

An annular member 20 is rotatably supported by a central part of the front end of the steering column 4 via a pivot shaft 30 and an arm 20A extending radially from the pivot shaft 30 and connected to the annular member 20 at its outer end. The two horn-shaped members of the steering wheel 3 are attached to the annular member 20 via a pair of radial and axial extensions 21 of the annular member 20. As can be readily appreciated, the provision of the annular member 20 is optional, but is preferable because it provides a secure support base for the steering wheel 3, and allows a relatively thick arm 20A to be used without causing any interference with other parts.

The central display/control panel 2 is fixedly held at a position immediately in front of the annular member 20 via a stay member 19 which is fixedly attached to the front end of the steering column, and passed through the annular member 20. Because the display/control panel 2 is located in the center of the steering wheel 3, the vehicle operator can see the display surface without being obstructed by the steering wheel 3 without regard to the angular position of the steering wheel 3. Also, the annular member 20 fills the gap which is defined between the front end of the steering column 4 and the display/control panel 2 and is conformal with the display/control panel 2 so as to define an aesthetically pleasing external appearance of the steering arrangement.

Thus, the steering wheel can be turned so far as the arm 20A does not interfere with the bracket 19. If desired, the bracket may extend axially outside the annular member, instead of inside the annular member 20. In the latter case, the steering wheel can be likewise turned so far as the arm 20A does not interfere with the bracket 19. In either case, to maximize the rotatable angular range of the steering wheel, it is desirable to attach the annular member to the central pivot shaft with a single arm.

The other end of the pivot shaft 30 is connected to an input shaft of a steering sensor 22 which may consist of a potentiometer, and is fixedly attached to the steering column 4 via a suitable bracket. An electric power steering system not shown in the drawings steer the front wheels of the vehicle according to the output of the stirring sensor 22. Such a system is often referred to as a steer-by-wire system. Alternatively, the other end of the pivot shaft 26 may be connected to an input shaft of a more conventional mechanical steering system with or without power assist, instead of such a steer-by-wire system.

To apply an appropriate resistance to the steering motion of the steering wheel 3, a linear damper 23 is connected between an outer end of the arm 20A and lower part of the front end of the steering column as shown in FIGS. 3a and 3b. Referring to FIG. 3a, when the steering wheel 3 is at its neutral position, the linear damper 23 extends along a diametric line intersecting with the axial center or rotational center of the pivot shaft 30, and this rotational center coincides with an intermediate part of the linear damper 23. When the steering wheel is turned, the cylinder bottom end 24 of the linear damper 23 moves along a circular path centered around the rotational center of the steering wheel while the piston rod end 25 the linear damper 23 remains stationary on the steering column 4. Therefore, the length of the linear damper 23 is maximized when the steering wheel 3 is at its neutral position, and diminishes as the steering wheel 3 is turned in either direction. Therefore, the linear damper 23 which is incorporated with a compression coil spring produces a force which urges the steering wheel 3 toward the neutral position. The linear damper 23 may be additionally provided with a viscous damper for improving the handling and stability of the steering system.

The steering wheel 3 is provided with various switches. The left horn member is provided with a passing light button and a turn signal switch 26 at its free end, and a control ring 27 for the automatic transmission system at its base end. The right horn member is provided with a light switch and a hazard warning switch 28 at its free end and a wiper switch 29 at its based end.

Referring to FIG. 4, the display unit 6 comprises a central display field 30 and a switch field 31 surrounding the display field 30. The display field 30 normally displays information on the vehicle speed and conditions of the engine, but can display other information by changing the display mode as described hereinafter. The switch field 30 comprises a plurality of switches which consist of touch sensors adapted to be activated simply by touching by means of the changes in the electrostatic capacitance or inductance.

By pressing the mode switch 31A provided in the center of the upper part of the switch field 31, a selection can be made from a number of different modes which may include an air conditioning mode and an entertainment mode. The remaining switches 31B and 31C are given with different functions depending on each selected mode.

For instance, in the air conditioning mode, the switches 31C on the right hand side can be used for adjusting the fan speed and activating the compressor for the air conditioning system, and the switches 31B on the left hand side can be used for selecting the mode of air flow. In the entertainment mode, as shown in FIG. 5, the switches 31B on the left hand side can be used for selecting the kind of entertainment, and the switches 31C on the right hand side can be used for selecting the functions of the selected kind of entertainment. The display field 30 may display information which is associated with the selected entertainment.

Although the present invention has been described in terms of a preferred embodiment thereof, it is obvious to a person skilled in the art that various alterations and modifications are possible without departing from the scope of the present invention which is set forth in the appended claims.

What is claimed is:

1. A steering arrangement incorporated with a display panel, comprising:

a steering column fixedly attached to a vehicle body;

an arm including an inner end connected to one end of a pivot shaft pivotally supported by said steering column and an outer end connected to a steering wheel, the arm extending in a radial direction;

a steering input shaft accommodated in the steering column and connected to the other end of the pivot shaft; and a display panel fixedly attached to said steering column by a bracket so as not to interfere with said arm, said display panel including a display surface located radially inside a part of said steering wheel adapted to be held by a hand.

2. A steering arrangement according to claim 1, wherein said display panel is additionally incorporated with a control panel.

3. A steering arrangement according to claim 1, wherein said display panel is additionally incorporated with a horn switch.

4. A steering arrangement according to claim 1, wherein said steering wheel is connected to said outer end of said arm via an annular member which is substantially concentric with a rotational center of said arm.

5. A steering arrangement according to claim 4, wherein said annular member and said display panel are provided with a substantially conformal peripheral profile.

6. A steering arrangement according to claim 4, wherein said bracket connecting said display panel to said steering column extends from said steering column axially through said annular member at a position diametrically opposite said arm when said steering wheel is at its neutral position.

7. A steering arrangement incorporated with a display panel, comprising:

a steering column fixedly attached to a vehicle body;

an arm including an inner end pivotally supported by said steering column and an outer end connected to a steering wheel;

a display panel fixedly attached to said steering column by a bracket so as not to interfere with said arm, said display panel including a display surface located radially inside a part of said steering wheel adapted to be held by a hand; and a linear damper connected between a part of said arm and a part of said steering column which is located diagonally opposite to said arm part with respect to the rotational center of said arm at a neutral position of said steering wheel.

8. A steering arrangement according to claim 1, wherein said steering wheel is provided with at least one switch.

* * * * *